United States Patent
Murty

[19]

[11] Patent Number: 6,040,561
[45] Date of Patent: Mar. 21, 2000

[54] HIGH VOLTAGE BUS AND AUXILIARY HEATER CONTROL SYSTEM FOR AN ELECTRIC OR HYBRID VEHICLE

[75] Inventor: Balarama Vempaty Murty, West Bloomfield, Mich.

[73] Assignee: General Motors Corporation, Detroit, Mich.

[21] Appl. No.: 09/343,735

[22] Filed: Jun. 30, 1999

[51] Int. Cl.[7] .................................................... H05B 1/02
[52] U.S. Cl. ............................ 219/494; 237/2 A; 303/3; 318/371
[58] Field of Search .................................... 219/494, 493, 219/490, 491; 237/2 A, 12.3 C; 303/3; 318/371, 376; 236/49.3; 290/40 C, 45, 4 R, 40 R, 44; 180/165, 65 R, 65

[56] References Cited

U.S. PATENT DOCUMENTS

| | | | |
|---|---|---|---|
| 3,878,913 | 4/1975 | Lionts et al. | 180/2.2 |
| 4,124,812 | 11/1978 | Naito et al. | 318/371 |
| 4,305,489 | 12/1981 | Hoppie | 192/4 A |
| 4,351,405 | 9/1982 | Fields et al. | 180/65.2 |
| 4,547,678 | 10/1985 | Metzner et al. | 290/40 C |
| 4,852,797 | 8/1989 | Goerlich | 237/2 A |
| 5,063,513 | 11/1991 | Shank et al. . | |
| 5,222,661 | 6/1993 | Wenhart | 236/49.3 |
| 5,384,522 | 1/1995 | Toriyama et al. | 318/371 |
| 5,412,293 | 5/1995 | Minezawa et al. | 318/376 |
| 5,433,512 | 7/1995 | Aoki et al. | 303/3 |
| 5,465,806 | 11/1995 | Higasa et al. | 180/165 |
| 5,707,115 | 1/1998 | Bodie et al. | 303/3 |
| 5,789,896 | 8/1998 | Fischer et al. | 318/759 |
| 5,839,800 | 11/1998 | Koga et al. | 303/152 |
| 5,847,671 | 12/1998 | Sailer et al. | 341/173 |
| 5,923,093 | 7/1999 | Tabata et al. | 290/40 C |

*Primary Examiner*—Teresa Walberg
*Assistant Examiner*—Jeffrey Pwu
*Attorney, Agent, or Firm*—George A. Grove

[57] ABSTRACT

A control system for an electric or hybrid electric vehicle includes a vehicle system controller and a control circuit having an electric immersion heater. The heater is electrically connected to the vehicle's high voltage bus and is thermally coupled to a coolant loop containing a heater core for the vehicle's climate control system. The system controller responds to cabin heat requests from the climate control system by generating a pulse width modulated signal that is used by the control circuit to operate the heater at a duty cycle appropriate for the amount of cabin heating requested. The control system also uses the heater to dissipate excess energy produced by an auxiliary power unit and to provide electric braking when regenerative braking is not desirable and manual braking is not necessary. The control system further utilizes the heater to provide a safe discharge of a bank of energy storage capacitors following disconnection of the battery or one of the high voltage connectors used to transmit high voltage operating power to the various vehicle systems. The control circuit includes a high voltage clamping circuit that monitors the voltage on the bus and operates the heater to clamp down the bus voltage when it exceeds a pre-selected maximum voltage. The control system can also be used to phase in operation of the heater when the bus voltage exceeds a lower threshold voltage and can be used to phase out the auxiliary power unit charging and regenerative braking when the battery becomes fully charged.

15 Claims, 3 Drawing Sheets

HIGH VOLTAGE BUS AND AUXILIARY HEATER CONTROL SYSTEM FOR AN ELECTRIC OR HYBRID VEHICLE

The Government of the United States of America has rights in this invention pursuant to Subcontract No. ZCB-3-13032-01 under Prime Contract No. DE-AC36-83CH10093 awarded by the U.S. Department of Energy.

TECHNICAL FIELD

This invention relates generally to electric and hybrid vehicles and, more particularly, to climate control systems, regenerative braking systems, and energy management systems used in such vehicles.

BACKGROUND OF THE INVENTION

The design of many of the different vehicle systems used in electric and hybrid vehicles involves a number of considerations that are unique to this class of automobiles. This is particularly true of the energy management systems that control delivery and regeneration of the power used to operate the vehicle's electric motor. This is also true to a lesser extent for the vehicle climate control systems since they do not have the large quantities of available heat that are produced by an internal combustion engine. Moreover, electric and hybrid electric vehicles (which are collectively referred to hereinafter as electric vehicles) typically have at least some features that have no counterpart in automobiles based on the internal combustion engine. For example, to help maximize fuel economy and minimize brake wear, electric vehicles sometimes use regenerative braking to recover kinetic energy back into the vehicle's high voltage battery. The implementation of these various vehicle systems require new approaches that seek to minimize the waste of available energy, regardless of whether that energy is in the form of heat or electrical or mechanical energy.

One of the problems encountered in the design of electric vehicle climate control systems is that the vehicle motor and other components typically do not generate enough heat to meet the requirements of interior cabin heating. This is often true for both purely electric vehicles as well as hybrid electric vehicles which may have additional heat available from an auxiliary power unit (APU) that commonly takes the form of a gas turbine or other heat engine. To provide the additional heat, some electric vehicles have utilized electric immersion heaters placed in the coolant loop. However, the use of these electric heaters are typically disfavored, as they are usually designed to have a capacity as high as about 5 kW and, consequently, have an adverse effect on the fuel economy and operating range of the vehicle. Instead, fuel fired heaters are sometimes used which, while more expensive, provide better fuel economy.

Many of the other design considerations important in an electric vehicle relate to use of the high voltage battery that provides the operating power needed by the vehicle's electric motor. Typically, a three-phase motor is used and is connected to provide drive power to two of the vehicle wheels. The motor is run using an inverter that is connected to receive 360 volt dc operating power from the high voltage battery by way of a high voltage supply bus. This high voltage bus is also used to provide operating power for other vehicle systems, including electronic power steering, the climate control compressor motor, and the traction control system. The electronics for these systems are typically located in a power electronics bay (PEB) using a high voltage cable harness. To protect against shock during servicing of the vehicle, a control line is often daisy-chained through this harness in a series fashion so that, upon disconnection of any of the connectors carrying the high voltage bus, the series connection will be broken and a double pole relay is then used to break the battery's positive and negative terminal connections from the high voltage bus. One problem with this arrangement is that it does not account for the large energy storage capacitors that are typically connected across the high voltage bus to control the ripple current on the bus. These capacitors can store a significant amount of energy and therefore pose a risk of shock even after battery disconnection. To discharge these capacitors, a discharge resistance is sometimes connected to the high voltage bus through a transistor switch which is closed as soon as the bus is disconnected from the battery.

Another problem that exists with the use of the high voltage bus is that it sometimes experiences high voltage spikes when inductive components are disconnected or switched off. These higher voltages can be damaging to both the high voltage battery and the electronic components used in the PEB. Moreover, for hybrid vehicles using a heat engine APU, the power generated by the APU cannot be unloaded quickly due to the thermal time constant of the system. Thus, the APU sometimes generates excess electric energy beyond that which can be used in operating the electric motor or charging the vehicle battery. This can result in an overvoltage condition on the high voltage bus, again potentially damaging the battery or other electrical components.

As mentioned above, electric vehicles sometimes utilize a regenerative braking system in which the electric motor is used as a generator to return some of the vehicle's kinetic energy back to the high voltage battery. In this situation, rather than the battery being used to supply operating power to run the electric motor, it is recharged and thus acts as a load on the motor, slowing the vehicle with or without the assistance of the manual brakes. This regenerative braking is used whenever possible, as it returns energy to the high voltage battery and helps prolong the life of the manual brakes. In some instances, regenerative braking cannot function because, for example, the battery is already fully charged or the vehicle is at too low a speed for the motor to generate a high enough voltage to recharge the battery. In these instances manual braking is used even though the regenerative braking would otherwise be capable of providing the necessary amount of speed reduction.

It is a general object of this invention to improve the energy management system of electric vehicles. Preferably, it is also an object of this invention to provide auxiliary cabin heating in a manner that captures available and otherwise wasted electric energy from other systems of the vehicle. It is also preferably an object of the invention to provide protection of the high voltage bus used in electric vehicles and to reduce the risk of shock from the bus when a connector or the battery is disconnected. It is also preferably an object of this invention to provide electric braking of the vehicle in instances when regenerative braking is undesirable and manual braking is unnecessary.

SUMMARY OF THE INVENTION

In accordance with one aspect of the present invention, there is provided an auxiliary heater control system for use in an electric vehicle having a climate control system and one or more wheels powered by an electric motor that is energized from a high voltage battery or other power source via a voltage supply bus. The heater control system includes a vehicle system controller and a heater control circuit having an input coupled to an output of the system controller. The heater control circuit has an electric heating element that is electrically coupled to the voltage supply bus and that is thermally coupled to the climate control system to provide heat for use by the climate control system using energy from the battery. The heater control circuit is responsive to a control signal from the system controller to provide operating power from the voltage supply bus to the heating element. The vehicle system controller has an input for receiving a cabin heat request from the climate control system and is responsive to the cabin heat request to send the control signal to the heater control circuit. In this way, the system controller is able to activate the electric heating element to provide heat to the climate control system in response to a cabin heat request. The system controller is also operable to monitor the voltage on the voltage supply bus and to provide the control signal to the heater control circuit when the monitored voltage exceeds a lower threshold voltage. Preferably, the control signal generated by the system controller is a variable signal, such as a pulse width modulated signal, that is indicative of a desired amount of energy to be dissipated by the electric heating element.

In accordance with another aspect of the present invention, there is provided an auxiliary heater control system for use with an electric vehicle in which the voltage supply bus includes an energy storage device, such as a capacitor or bank of capacitors, that stores significant amounts of energy when the voltage supply bus is charged up to its operating voltage. The control system includes a heater control circuit as described above and includes a vehicle system controller that not only controls operation of the electric heating element in response to cabin heating requests from the climate control system, but that is also operable upon disconnection of the power source from the voltage supply bus to provide the control signal to the heater control circuit. This causes the heater control circuit to discharge the capacitors via the voltage supply bus following disconnection of the power source from the voltage supply bus.

In accordance with another aspect of the invention, there is provided a control system for a hybrid electric vehicle having an auxiliary power unit that provides energy to the voltage supply bus. The control system includes a vehicle system controller and a control circuit having an input coupled to an output of the system controller. The control circuit has an energy dissipation device that is electrically coupled to the voltage supply bus to dissipate energy supplied to the voltage supply bus. The system controller is operable to generate a control signal that is provided to the control circuit. The control circuit is responsive to this control signal to provide operating power from the voltage supply bus to the energy dissipation device. The system controller can therefore activate the energy dissipation device on command to dissipate energy supplied to the bus by the auxiliary power unit. Preferably, the system controller includes a second output that is coupled to the auxiliary power unit, with the system controller being operable to monitor the voltage on the voltage supply bus and reduce the amount of energy supplied to the voltage supply bus from the auxiliary power unit when the monitored voltage exceeds a lower voltage limit. Preferably, the energy dissipation device comprises an electric immersion heater that is thermally coupled to the vehicle's climate control system so that it can also be used to provide supplemental cabin heating, as described above.

In accordance with yet another aspect of the invention, there is provided a control system for an electric vehicle having a regenerative braking system for returning energy to the power source via the voltage supply bus during braking of the vehicle. The control system includes a vehicle system controller and control circuit having an energy dissipation device as described above, with the system controller being operable to activate the energy dissipation device during regenerative braking to thereby dissipate energy supplied to the voltage supply bus by the regenerative braking system. Preferably, the system controller includes a second output that is coupled to the regenerative braking system, with the system controller being operable to monitor the voltage on the voltage supply bus and reduce the amount of energy supplied to the voltage supply bus from the regenerative braking system when the monitored voltage exceeds a lower voltage limit.

BRIEF DESCRIPTION OF THE DRAWINGS

A preferred exemplary embodiment of the present invention will hereinafter be described in conjunction with the appended drawings, wherein like designations denote like elements, and.

DESCRIPTION OF THE PREFERRED EMBODIMENT

Figure 1:
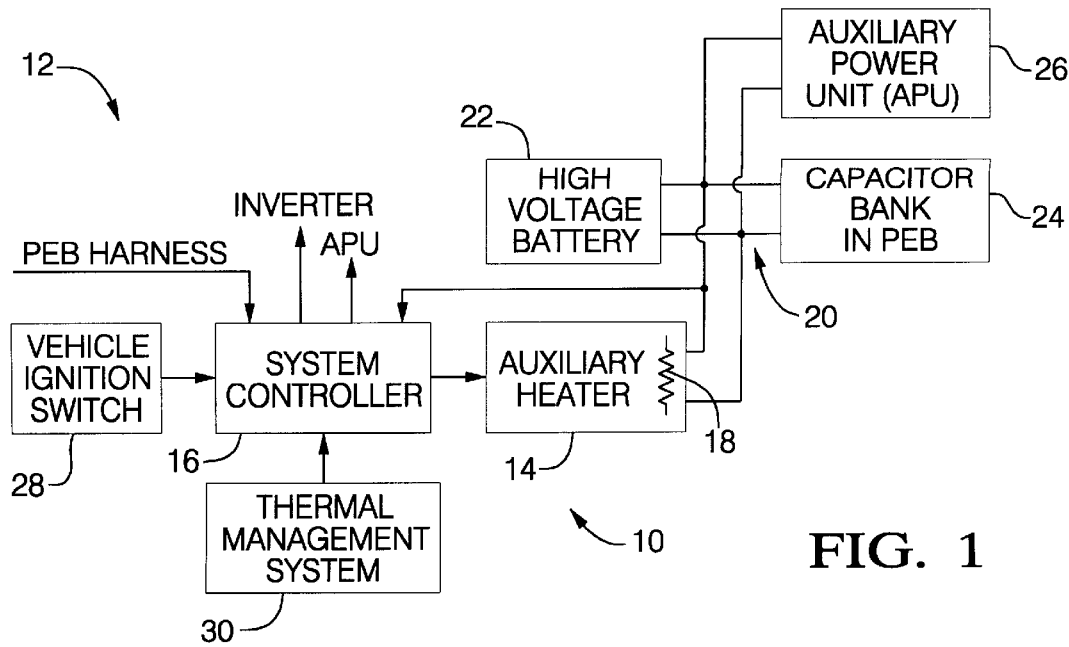
FIG. 1 is a block diagram showing a preferred embodiment of an auxiliary heater control system of the present invention as it would be utilized in conjunction with an electric vehicle's thermal management system, high voltage bus, and auxiliary power unit.

Referring to FIG. 1, there is shown an auxiliary heater control system, designated generally as 10, which is connected as a part of an overall energy management system 12 of an electric vehicle. Although the invention can be utilized as a part of a purely electric vehicle, the illustrated embodiment will be discussed in connection with a hybrid electric vehicle. Heater control system 10 is embodied in an auxiliary heater control circuit 14 and partially in a vehicle system controller 16 which is also used in a conventional fashion to control other aspects of the vehicle energy management system 12. In general, heater control circuit 14 is an analog circuit that receives commands from the system controller 16 and controls operation of an electric immersion heater 18 using power supplied to the vehicle's high voltage bus 20 from a battery 22, capacitor bank 24, and auxiliary power unit (APU) 26. This immersion heater 18 is connected in the vehicle's coolant loop and is used to (1) provide supplemental heat for climate control purposes, (2) protect the high voltage bus 20 from excessive voltages that could otherwise damage the system components, (3) discharge capacitor bank 24 to prevent electric shock during servicing, (4) dissipate excess energy supplied by APU 26, and (5) provide electric braking in those instances when regenerative braking cannot be used and manual braking is not needed.

System controller 16 is a microprocessor-based circuit which operates under program control to run the various vehicle systems. It receives a variety of inputs, including a daisy chained signal from the power electronics bay (PEB) wiring harness, a signal from the vehicle ignition switch 28, and a cabin heat request from the climate control or thermal management system 30. It also monitors the voltage on the high voltage bus 20 (i.e., the voltage of battery 22). As will be discussed in greater detail below, using the information obtained from its inputs, system controller 16 determines whether operation of the electric heater 18 is needed and, if so, sends a control signal to auxiliary heater control circuit 14 to initiate operation of the heater. This control signal is a variable signal in the form of a pulse width modulated control signal operating at 10 Hz, with the pulse width (i.e., the duty cycle) being indicative of the percentage of full heater operation desired. In this way, system controller 16 can control the amount of heating provided by heater 18 and can control the amount of electric energy from bus 20 that is dissipated by heater 18.

High voltage battery 22 can be a 360 volt battery that supplies power to and is recharged via high voltage bus 20. The capacitor bank 24 is located in the power electronics bay (PEB) (not shown) and comprises a set of high voltage, high valued capacitors connected across the positive and negative nodes of high voltage bus 20. APU 26 can be a conventional heat engine driven alternator such as a Stirling or other gas turbine engine. Its output leads are connected to high voltage bus 20 to provide energy that is used to both recharge battery 22 and operate the vehicle's electric motor (not shown) via the PEB. Thermal management system 30 provides interior cabin climate control and can be a conventional system that sends cabin heat requests to system controller 16 by way of a Class 2 (J-1850) bus. These cabin heat requests are indicative of the amount of heating desired and are used by system controller 16 to generate an output control signal having an appropriate duty cycle for the amount of heating requested.

Figure 2:
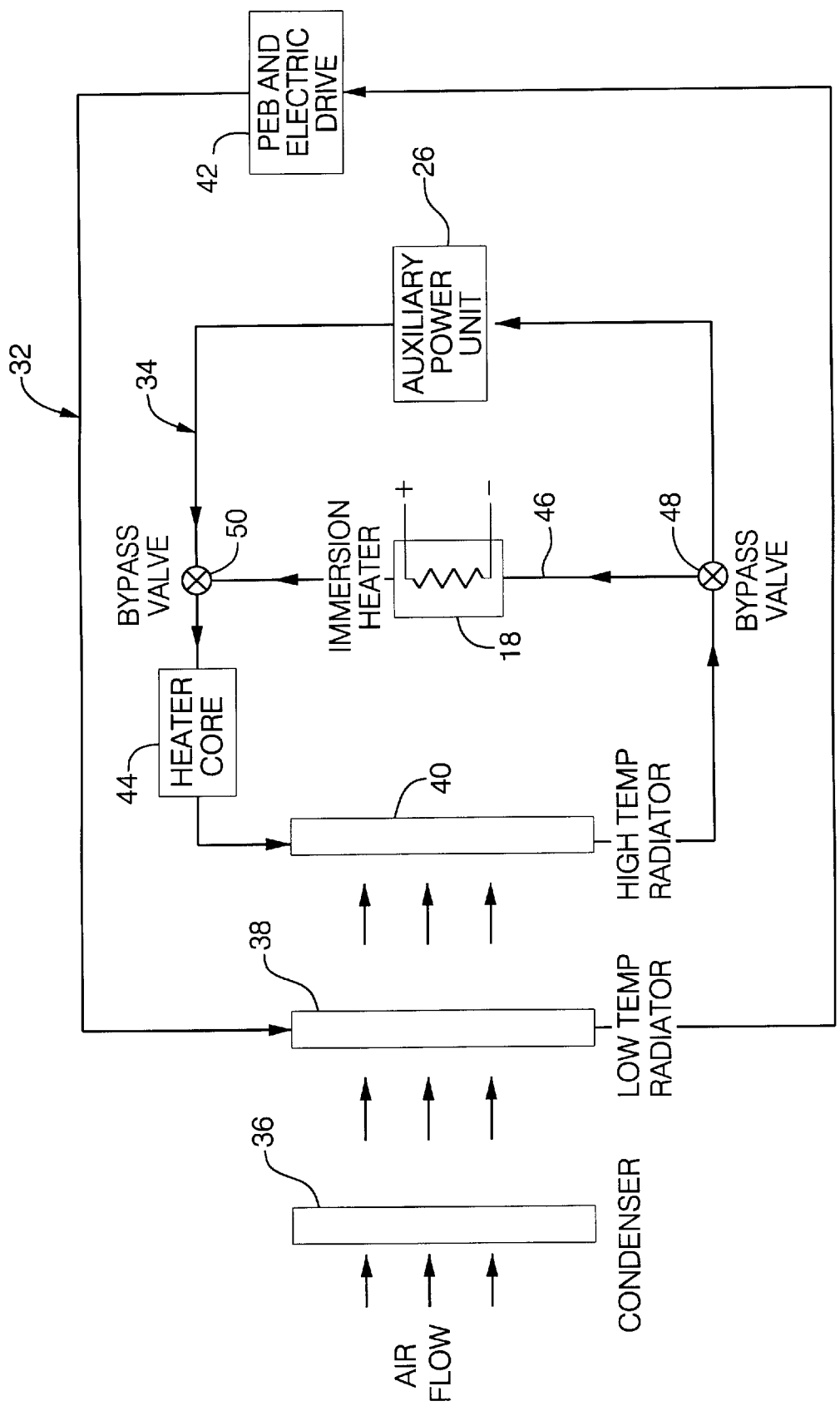
FIG. 2 is a block diagram of an electric vehicle's thermal system showing the utilization of the electric immersion heater used in the heater control system of FIG. 1.

Turning now to FIG. 2, there is shown a diagram of the vehicle's thermal system, which includes two isolated coolant loops, a low temperature loop 32 and a high temperature loop 34. Air entering the vehicle grill first passes the climate control system's HVAC condenser 36, then a low temperature radiator 38, and finally flows over a high temperature radiator 40. The low temperature coolant loop 32 is used to remove heat from the vehicle's electric motor and electronics contained in the PEB, as indicated at 42. The high temperature coolant loop 34 removes heat from APU 26 and makes that heat available to the climate control system's heater core 44 for use in cabin heating. This loop also includes a branch 46 in parallel with APU 26 that is fed by a bypass valve 48 at a flow rate that is roughly ⅙ of that used to remove heat from APU 26. Coolant branch 46 includes the electric immersion heater 18 which, when operated by heater control circuit 14, heats the coolant to thereby provide additional heat to heater core 44 via a second bypass valve 50.

Figure 3:
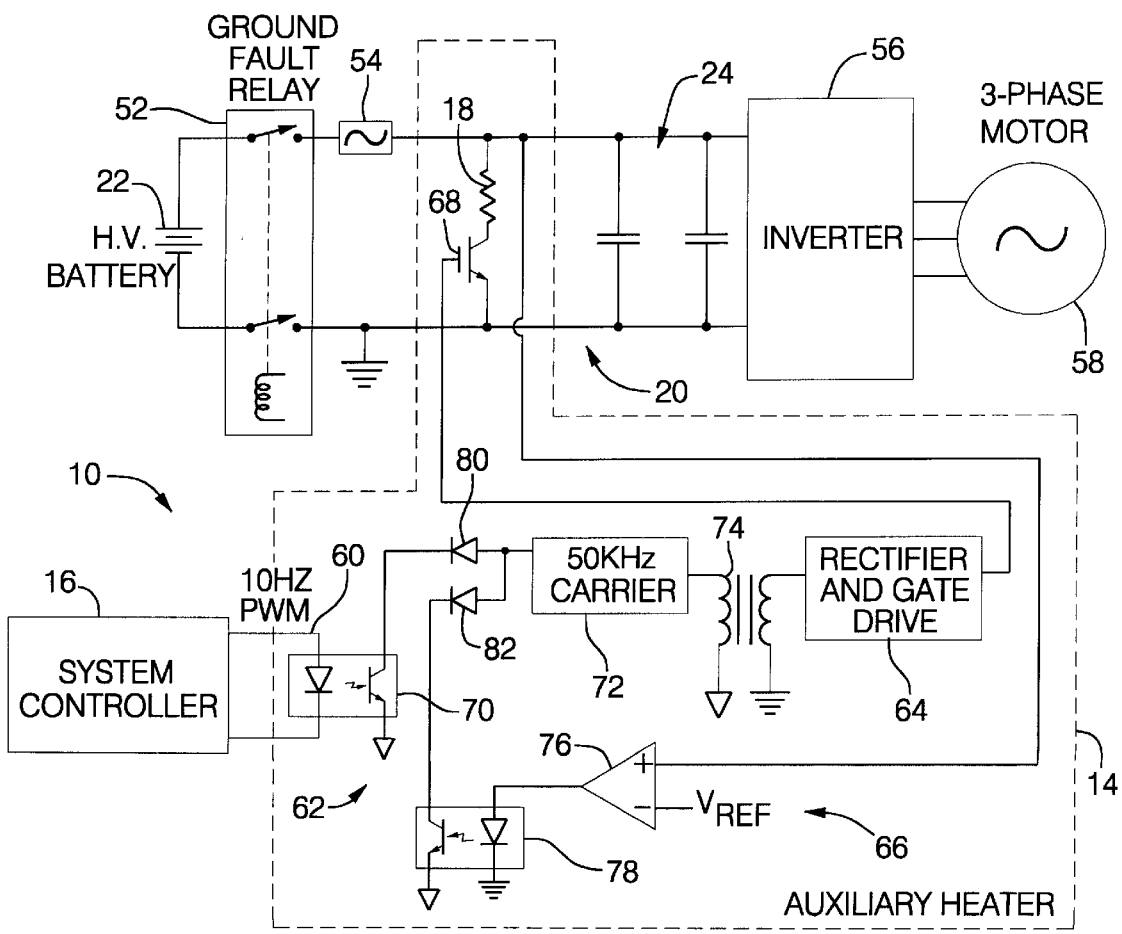
FIG. 3 is a partially schematic and partially diagrammatic depiction of the auxiliary heater control system of FIG. 1 as it would be used in connection with the vehicle's electric motor drive circuitry.

FIG. 3 depicts the basic construction of auxiliary heater control circuit 14 and its interface with high voltage bus 20. As shown, the high voltage battery 22 is connected to the high voltage bus 20 via a ground fault relay 52 and a fuse 54 that provides overcurrent protection. Also connected to bus 20 is capacitor bank 24 and an inverter 56, both of which are located within the PEB. Inverter 56 provides the three-phase power needed to run the vehicle's electric motor 58 and can be of a conventional design. It also provides charging of battery 22 when motor 58 is used for regenerative braking. Motor 58 can also be of conventional design and is coupled to one or more of the vehicle wheels by a suitable transmission (none of which are shown). As will be appreciated by those skilled in the art, other vehicle circuits that are not shown are also connected to high voltage bus 20, including APU 26 and the various circuits found in the PEB.

In general, auxiliary heater control circuit 14 includes a control signal input 60, an isolating circuit 62, a rectifier and transistor gate drive circuit 64, a high voltage clamp circuit 66, and a transistor switch 68 that is used to electrically connect immersion heater 18 between the positive and negative nodes of high voltage bus 20. The pulse width modulated (PWM) control signal entering on the input 60 of control circuit 14 is passed to isolating circuit 62 where it activates a solid state opto-electronic isolator 70 that passes the signal to a carrier frequency generator 72. As is common in electric vehicle high voltage system designs, the high voltage bus 20 floats relative to the vehicle 12 volt ground, and isolating circuit 62 provides the isolation of the high voltage bus 20 necessary to maintain it floating. Frequency generator 72 provides a 50 kHz carrier waveform that is modulated by the 10 Hz PWM signal from system controller 16. This high frequency carrier is used to energize an isolating transformer 74, the output of which is provided to rectifier and gate drive circuit 64. The relatively high frequency 50 kHz carrier is used so that the size of transformer 74 can be maintained relatively small. As will be understood by those skilled in the art, the frequency generator can be implemented using a LM555 timer which drives a transistor that switches current through the primary winding of transformer 74. Modulation of the 50 kHz carrier frequency can be accomplished by using the 10 Hz PWM control signal to intermittently switch 12 volt dc operating power to the timer chip.

The modulated 50 kHz signal received by circuit 64 is first rectified to remove the 50 kHz carrier and then is used to drive transistor switch 68 intermittently on and off at the 10 Hz PWM rate. This signal can have a duty cycle of anywhere between 0–100%, with transistor 68 being switched off when the duty cycle is at 0%, being switched fully on when the duty cycle is at 100%, and being intermittently switched on and off at a 10 Hz rate when the duty cycle is between these two limits. Transistor 68 can be any suitable power transistor and is preferably an insulated gate bipolar junction transistor that can withstand collector to emitter currents of about 15–20 amps.

As mentioned above, control circuit 14 also includes a high voltage clamp circuit 66. This circuit is used to activate the heater 18 in the event the voltage on bus 20 increases to a dangerous level. Voltage clamp circuit 66 can be implemented in any of a number of different ways that will be apparent to those skilled in the art. In the illustrated embodiment, it is shown diagrammatically using a comparator 76 that compares the voltage on bus 20 to a reference voltage $V_{REF}$ that is indicative of a pre-selected maximum voltage (e.g., 435 volts dc). Of course, a voltage divider or other suitable circuitry would be utilized to divide down the high voltage bus voltage to a level usable with a typical low voltage comparator. When the bus voltage is below this value, comparator 76 outputs a logic low level that has no effect. However, when the bus voltage exceeds this maximum voltage, comparator 76 activates opto-electronic isolator 78 which activates the 50 kHz frequency generator 72 to thereby switch transistor 68 fully on and clamp the high voltage bus 20 using heater 18. Clamp circuit 66 can include built in hysteresis so that once switched on, the circuit will maintain heater 18 on until the bus voltage falls to some value below the pre-selected maximum voltage.

The input to frequency generator 72 from clamping circuit 66 is logically OR-ed with the PWM control signal input from system controller 16, as indicated functionally by the OR-tied diodes 80 and 82 shown in FIG. 3. As will be discussed below, system controller 16 also monitors the voltage on bus 20 and operates heater control circuit 14 depending upon the measured voltage. However, that software controlled monitoring of the battery voltage is carried out for the purpose of providing electric braking and dissipation of excess energy from APU 26, both of which are carried out at lower bus voltages (e.g., 400–420 volts). This software is not used to protect battery 22 and other electronic components from excessive bus voltages. Rather, clamping circuit 66 is used for this purpose and is implemented as a hardware circuit so that it provides a fast response that is suitable for handling transient spikes and the like which can occur when using inductive components.

Typically, the low voltage electronics such as are shown in the auxiliary heater control circuit 14 of FIG. 3 are operated from the vehicle's 12 volt supply. In this regard, a high impedance differential amplifier could be used in front of comparator 76 with a suitably high input impedance being used between the amplifier and the positive and negative nodes of bus 20 so that the circuit would maintain the desired degree of isolation between the high voltage bus and the 12 volt ground. However, if desired, control circuit 14 can be operated from a low voltage supply that is developed off the high voltage bus itself. In this way, the hardware clamp circuit 66 will still operate to protect the high voltage bus 20 even if the vehicle's 12 volt supply is removed.

Referring back to FIG. 1, heater control system 10 can be used not only to control heater 18 for the purpose of providing supplemental heat for the climate control system, but can also be used to control heater 18 to provide electric braking and to dissipate excess energy generated by APU 26. This can be accomplished by using system controller 16 to monitor the voltage on bus 20 and activate heater 18 when the bus voltage exceeds a lower threshold voltage. This activation of heater 18 can be duty cycle controlled so that the heater is operated at a relatively low duty cycle when the bus voltage exceeds the lower threshold by only a small amount and is operated at an increasing duty cycle as the bus voltage continues to increase. Preferably, the duty cycle of the control signal generated by system controller 16 is proportional to the difference between the bus voltage and the lower threshold voltage, with the controller having an upper threshold voltage above which the heater is operated at 100% duty cycle. This variable duty cycle control can be accomplished using the same 10 Hz PWM control scheme discussed above in connection with FIG. 3. The lower and upper threshold voltages are both below the pre-selected maximum voltage that used in the clamp circuit 66 to trigger heater 18. In this way, the software executed by system controller 16 can initially have control of heater 18 to control bus voltage with the hardware clamping circuit 66 only coming into play when there are dangerously high excessive voltages appearing on the bus 20.

Figure 4:
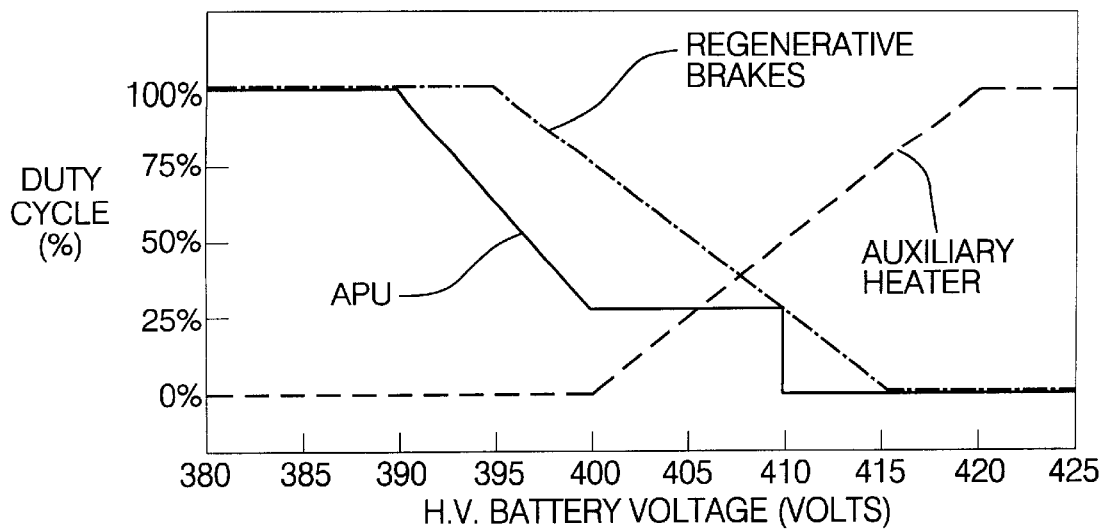
FIG. 4 is an exemplary graph showing the phasing out of the APU and regenerative braking and the phasing in of the electric heater as the high voltage battery voltage increases.

With reference to both FIGS. 1 and 4, heater control system 10 can also be used to control the amount of regenerative braking as well as the amount of charging energy provided by APU 26 to the high voltage bus 20. For this purpose, system controller 16 includes an output control signal that is provided to the inverter 56 (shown in FIG. 3) and an output control signal that is provided to APU 26. These PWM control signals are used to control the duty cycle of the charging circuits contained within APU 26 and inverter 56. This arrangement permits system controller 16 to cut back on the amount of energy provided by APU 26 and inverter 56 as the battery 22 becomes fully charged. An exemplary graph of this phasing out of the APU charging and regenerative braking is shown in FIG. 4 along with the concomitant phasing in of heater 18. In this example, system controller 16 maintains heater 18 off while permitting regenerative braking and APU charging at 100% until the bus voltage reaches a lower APU limit of 390 volts, at which point controller 16 begins to cut back on the duty cycle of APU charging. The APU duty cycle is phased out in a linear fashion until the bus voltage reaches 400 volts, as which point it is held at a 25% duty cycle while the duty cycle of heater 18 is ramped up from 0%. If the bus voltage continues to increase to an upper APU limit of 410 volts (at which point heater 18 is operating at 50% duty cycle), then the APU charging is shut off completely. The duty cycle of heater 18 continues to increase with increasing bus voltage until 420 volts, at which point heater 18 is fully on at 100% duty cycle.

Similarly, the regenerative braking can be permitted to run at 100% duty cycle until some lower voltage limit (e.g., 395 volts) is reached, at which point it is phased out by linearly decreasing its duty cycle with increasing bus voltage until some upper limit voltage (e.g., 415 volts) where the regenerative braking is stopped altogether. As will be appreciated, this permits software blending of regenerative and electric braking to help minimize the need for manual braking. Moreover, the electric braking can also be used in conjunction with mechanical braking to reduce the amount of manual braking needed. Also, it will of course be appreciated that the phasing in of heater 18 and the phasing out of APU charging and regenerative braking shown in FIG. 4 is exemplary only and can be accomplished at different voltages and using different (e.g., non-linear) profiles.

With reference to FIGS. 1 and 3, heater control system 10 can also be used to discharge capacitor bank 24 in the event that the battery 22 or a connector on the PEB wiring harness is disconnected. As discussed above, this is desirable to prevent the incidence of electric shock during servicing of the vehicle. When the ignition switch 28 is first turned on, capacitors 24 are pre-charged to the nominal bus voltage (360 volts) in a conventional manner and the ground fault relay 52 is thereafter closed to connect battery 22 to high voltage bus 20. Thereafter, system controller 16 monitors the daisy chain signal from the PEB wiring harness to determine if any of the connectors in the wiring harness have been disconnected. As discussed above, this daisy chain signal comprises a series-connected wire that runs through each high voltage connector in the harness so that if any of the connectors are disconnected, the chain is broken and this condition is detected by controller 16. This daisy chained signal is also wired through the ground fault relay 52 so that it also detects disconnection of the battery 22. Upon detecting a disconnection using the daisy chain signal, system controller 16 opens the ground fault relay 52 to disconnect the battery (if not already disconnected) and then operates heater 18 at 100% duty cycle to discharge the capacitor bank 24.

Figure 5:
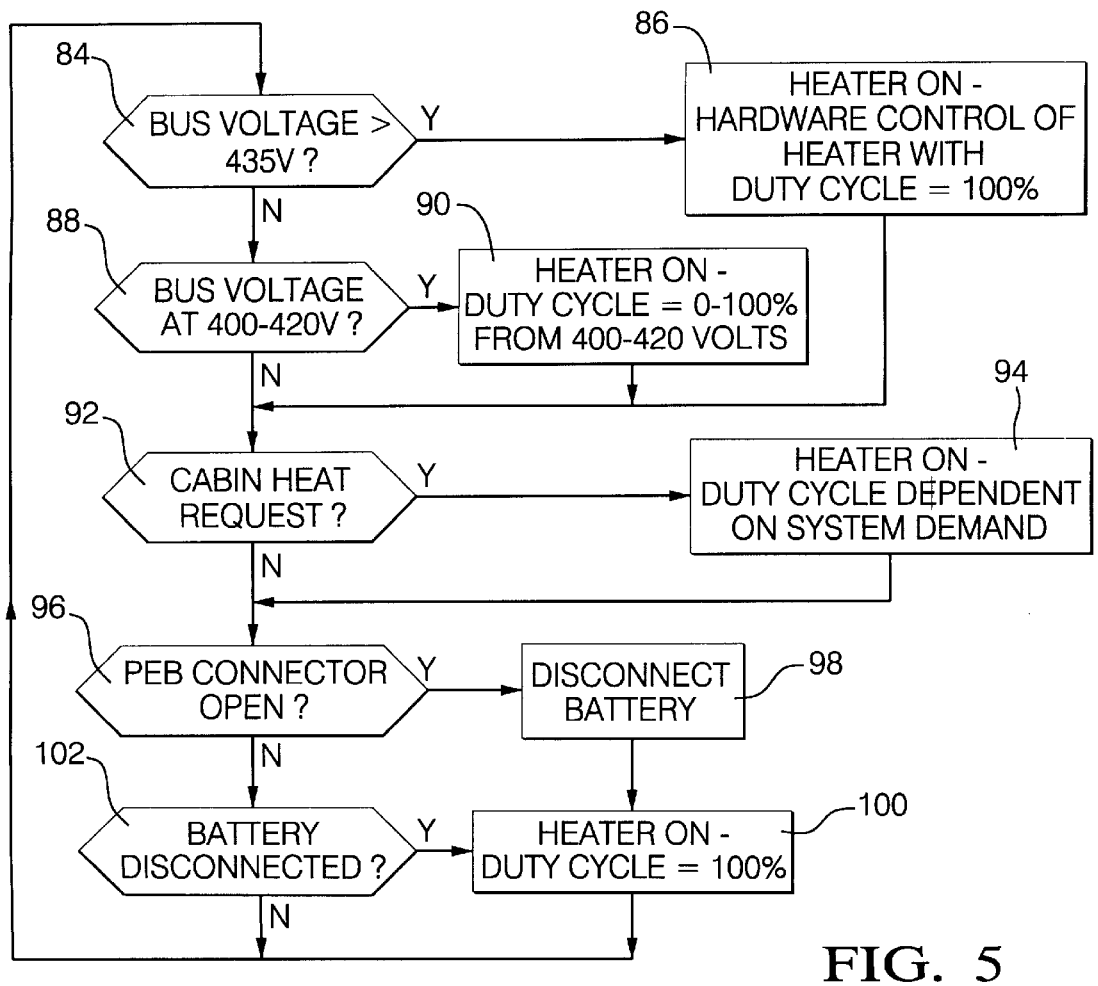
FIG. 5 is a diagram showing the logic utilized by the heater control system of FIG. 1.

Referring now to FIG. 5, a diagram of the various conditions handled by heater control system 10 is shown. Although these conditions are depicted in the form of a sequential process, it will be understood that they are preferably monitored in parallel, with the appropriate action being taken when any condition is detected. The first condition shown is that of the bus voltage being over 435 volts, as indicated at block 84. If so, the heater is switched on under hardware control at 100% duty cycle. This is shown at block 86. As will be appreciated, the steps represented by these two blocks are carried out, not in software, but in hardware by the high voltage clamping circuit 66 of FIG. 3. The remaining blocks of FIG. 5 are all preferably implemented in the software control program of system controller 16.

At block 88, if the bus voltage is between 400–420 volts, then the process moves to block 90 where the heater is switched on at a duty cycle of between 0–100% depending on how much the bus voltage exceeds the lower threshold voltage of 400 volts. Although not shown in FIG. 5, it will be appreciated from the graph of FIG. 4 that if the bus voltage is between 420–435 volts, the heater will be run at 100% duty cycle under program control from system controller 16. Moreover, if desired, the software program of controller 16 can compare the monitored bus voltage with the lower limits for the APU charging and regenerative braking and begin phasing out of these sources of electric energy, as discussed in connection with FIG. 4.

The next condition shown in FIG. 5 is at block 92 where a check is made to determine if there is a cabin heat request from thermal management system 30. If so, the process moves to block 94 where the heater is turned on at a duty cycle that is determined based upon the heating demand from thermal management controller 30. The next condition checked is shown at block 96 where the daisy chain signal is monitored to determine if there is any PEB connector open. If so, the process moves to block 98 where the battery is disconnected from the bus, following which the process moves to block 100 where the heater is operated at 100% duty cycle to discharge the bank of energy storage capacitors. The final monitored condition is shown at block 102 where a check is made to determine whether the battery has been disconnected by, for example, a ground fault that tripped relay 52. If so, the process moves to block 100 where the heater is switched fully on to discharge the capacitors. As discussed above, if the daisy chain signal is routed through the ground fault relay 52, then the daisy chain disconnection checked at block 96 will detect a disconnection of either the battery or a PEB connector and the check shown at block 102 would not be necessary.

Thus, it will be appreciated that auxiliary heater control circuit 10 provides a multiplicity of functions that together provide improved electric vehicle operation and safety in a manner that minimizes the waste of available energy. Excess energy from the APU can be converted to heat which can be used to provide supplemental heat for climate control. Similarly, kinetic energy of the moving vehicle can be converted into heat while slowing the vehicle, which helps minimize brake wear and helps contribute to cabin heating when needed. Also, dangerous high voltages and transient spikes can be clamped and the energy storage capacitors used on the high voltage bus can be safely discharged following disconnection of the battery or any of the high voltage connectors.

Furthermore, it will be understood by those skilled in the art that, if auxiliary cabin heating is not needed or desired, electric heater 18 need not be implemented as an immersion heater in the coolant loop and need not be used in conjunction with the climate control system at all. Rather, it could be implemented simply as a high wattage resistive load that is used to accomplish the other aspects of the illustrated embodiment noted above; e.g., protection of the high voltage bus 20, discharging of the capacitors 24 for shock protection, dissipation of excess energy from APU 26, and implementation of electric braking. In this event, auxiliary heating control circuit 14 and system controller 16 would instead together comprise a control system having the same electronic design discussed above, but that would not be used for auxiliary heating.

It will thus be apparent that there has been provided in accordance with the present invention a control circuit for an electric vehicle which achieves the aims and advantages specified herein. It will of course be understood that the foregoing description is of a preferred exemplary embodiment of the invention and that the invention is not limited to the specific embodiment shown. Various changes and modifications will become apparent to those skilled in the art and all such variations and modifications are intended to come within the scope of the appended claims.

I claim:

1. An auxiliary heater control system for a vehicle having a climate control system and one or more wheels powered by an electric motor that is energized from a power source via a voltage supply bus, said heater control system comprising:

a heater control circuit having an electric heating element that is electrically coupled to the voltage supply bus and thermally coupled to the climate control system to provide heat for use by the climate control system using energy from the power source, said heater control circuit further including an input and being responsive to a control signal on said input to provide operating power from the voltage supply bus to said heating element; and a vehicle system controller having an input for receiving a cabin heat request from the climate control system and having an output coupled to said input of said heater control circuit, said system controller being responsive to a cabin heat request to provide said heater control circuit with said control signal, whereby said electric heating element provides heat to the climate control system in response to a cabin heat request;

wherein said vehicle system controller is operable to monitor the voltage on the voltage supply bus and to provide said control signal to said heater control circuit when the monitored voltage exceeds a lower threshold voltage, whereby said electric heating element dissipates energy supplied to said voltage supply bus when the monitored voltage exceeds the lower threshold voltage.

2. An auxiliary heater control system as defined in claim 1, wherein said vehicle system controller provides said control signal as a variable signal indicative of a desired amount of energy to be dissipated by said electric heating element and wherein said heater control circuit is operable in response to said control signal to control the amount of energy dissipated by said electric heating element.

3. An auxiliary heater control system as defined in claim 2, wherein said heater control circuit includes a switch in series with said electric heating element and wherein said heater control circuit is operable to alternately toggle said switch on and off at a duty cycle that is dependent upon said control signal.

4. An auxiliary heater control system as defined in claim 2, wherein, when the monitored voltage is greater than said lower threshold voltage, said vehicle system controller is operable to provide said heater control circuit with a control signal that is determined using the monitored voltage.

5. An auxiliary heater control system as defined in claim 4, wherein said control signal is proportional to the difference between the monitored voltage and said lower threshold voltage.

6. An auxiliary heater control system as defined in claim 1, wherein said heater control circuit is operable to monitor the voltage on the voltage supply bus and to dissipate energy supplied to said voltage supply bus when the monitored voltage exceeds a pre-selected maximum voltage that is greater than said lower threshold voltage.

7. An auxiliary heater control system for a vehicle having a climate control system and one or more wheels powered by an electric motor that is energized from a power source via a voltage supply bus having an energy storage device, said heater control system comprising:

a heater control circuit having an electric heating element that is electrically coupled to the voltage supply bus and thermally coupled to the climate control system to provide heat for use by the climate control system using energy from the power source and energy storage device, said heater control circuit further including an input and being responsive to a control signal on said input to provide operating power from the voltage supply bus to said heating element;

a vehicle system controller having an input for receiving a cabin heat request from the climate control system and having an output coupled to said input of said heater control circuit, said system controller being responsive to a cabin heat request to provide said heater control circuit with said control signal, whereby said electric heating element provides heat to the climate control system in response to a cabin heat request;

said vehicle system controller being operable upon disconnection of the power source from the voltage supply bus to provide said control signal to said heater control circuit, whereby said heater control circuit is operable to discharge the energy storage device via the voltage supply bus following disconnection of the power source from the voltage supply bus.

8. An auxiliary heater control system as defined in claim 7, wherein said heater control circuit includes a switch in series with said electric heating element and wherein said switch and electric heating element are connected in parallel with the energy storage device.

9. An auxiliary heater control system as defined in claim 7, wherein said energy storage device comprises one or more capacitors.

10. A control system for a hybrid electric vehicle having an auxiliary power unit and one or more wheels powered by an electric motor that is energized using the auxiliary power unit and a power source via a voltage supply bus, said control system comprising:

a control circuit having an energy dissipation device that is electrically coupled to the voltage supply bus to dissipate energy supplied to the voltage supply bus, said control circuit further including an input and being responsive to a control signal on said input to provide operating power from the voltage supply bus to said energy dissipation device; and a vehicle system controller having an output coupled to said input of said control circuit, said system controller being operable to generate said control signal to thereby cause said control circuit to dissipate energy supplied to the voltage supply bus by the auxiliary power unit.

11. A control system as defined in claim 10, wherein the voltage supply bus includes an energy storage device and wherein said vehicle system controller is operable upon disconnection of the power source from the voltage supply bus to provide said control signal to said control circuit, whereby said control circuit is operable to discharge the energy storage device following disconnection of the power source from the voltage supply bus.

12. A control system as defined in claim 10, wherein said vehicle system controller includes an output that is coupled to the auxiliary power unit and wherein said vehicle system controller is operable to monitor the voltage on the voltage supply bus and to reduce the amount of energy supplied to the voltage supply bus from the auxiliary power unit when the monitored voltage exceeds a lower voltage limit.

13. A control system as defined in claim 10, wherein said control circuit is operable to monitor the voltage on the voltage supply bus and to dissipate energy supplied to said voltage supply bus when the monitored voltage exceeds a pre-selected maximum voltage.

14. A control system as defined in claim 10, wherein said vehicle system controller is operable to dissipate excess energy supplied to the voltage supply bus by monitoring the voltage on the voltage supply bus and generating said control signal when the monitored voltage exceeds a lower threshold voltage.

15. A control system as defined in claim 10, wherein said energy dissipation device comprises an electric heating element.

* * * * *